US006636026B1

(12) United States Patent
Nomoto

(10) Patent No.: US 6,636,026 B1
(45) Date of Patent: Oct. 21, 2003

(54) ELECTRIC APPLIANCE CAPABLE OF SAVING POWER CONSUMPTION

(75) Inventor: Tetsushi Nomoto, Yokohama (JP)

(73) Assignee: Nikon Corporation, Tokyo (JP)

( * ) Notice: Subject to any disclaimer, the term of this patent is extended or adjusted under 35 U.S.C. 154(b) by 499 days.

(21) Appl. No.: 09/709,720

(22) Filed: Nov. 13, 2000

(30) Foreign Application Priority Data

Nov. 15, 1999 (JP) ............................ 11-324098

(51) Int. Cl.[7] .................. G05B 24/02; H01H 35/00
(52) U.S. Cl. ............................. 323/318; 307/126
(58) Field of Search ..................... 323/266, 307, 323/318, 352; 307/112, 116, 125, 126, 134, 135, 140, 141

(56) References Cited

U.S. PATENT DOCUMENTS 5,675,503 A * 10/1997 Moe et al. .................. 364/492
6,493,643 B1 * 12/2002 Aisa ........................... 702/60
6,509,658 B1 * 1/2003 Kim ........................... 307/117
6,525,666 B1 * 2/2003 Shimoda ..................... 340/636

FOREIGN PATENT DOCUMENTS

JP        11-190982       7/1999

OTHER PUBLICATIONS

Keizo Sakurai; Sanyo Electric releases "full–auto" living–room air conditioner utilizing sensors that detects the existence of a person (Sep. 1, 1999).(with English translation) http://nmc.nikkeibp.co.jp/news4/n9822.html.

Keizo Sakurai; Sanyo Electric saves 15% of the power consumption of a refrigerator by saving operation utilizing a light sensor (Oct. 19, 1999).(with English translation) http://biztech.nikkeibp.co.jp/wcs/leaf?CID=onair/biztech/mech/85050.

* cited by examiner

Primary Examiner—Matthew V. Nguyen
(74) Attorney, Agent, or Firm—Oliff & Berridge, PLC

(57) ABSTRACT

It is an object of the present invention to provide an electric appliance that can save the standby power consumption, in particular, to provide an electric appliance that can save the standby power consumption without sacrificing the convenience of a remote controller and the effect of the warm-up. An electric appliance capable of saving power consumption, the electric appliance having its original function, comprises a first unit having an active state for performing the original function and a rest state, a first power consumption occurring in the active state, a second unit having an effective state capable of causing the first unit to change from the rest state to the active state and an ineffective state incapable of causing the change in the first unit, a second power consumption less than the first power consumption occurring in the effective state and a third unit that changes the second unit from the ineffective state to the effective state when a first predetermined condition is satisfied, whereby the second power consumption is saved until the first predetermined condition is satisfied.

32 Claims, 5 Drawing Sheets

ELECTRIC APPLIANCE CAPABLE OF SAVING POWER CONSUMPTION

BACKGROUND OF THE INVENTION

1. Field of the Invention

The present invention relates to an electric appliance, and more particularly to an electric appliance capable of saving power consumption.

2. Description of the Related Art

Recently, many electric appliances, especially home appliances have a remote controller that remote-controls the operation of them. Namely, the electric appliances have a remote-control signal receiver that receives the command signal such as infrared or ultrasonic output by the remote controller when the remote controller is operated in addition to its function unit that performs its original function. Said remote-control signal receiver is always in a standby state so that it may receive the action command signal from the remote controller.

Furthermore, some of the electric appliances apply an electric current to a part of the electric circuit (warm-up circuit) and make it to be in a warm-up state all the time. As a typical example, the audio-visual equipment such as TV set or video deck can be cited, but it is possible with other electric appliances, not limited to these. And, many of the electric appliances display the time when they are not in use. Electric appliances that have each of said functions consume the standby power.

Recently, the big standby power consumption of electric appliances, especially home appliances has become a problem. According to the data of Tokyo Electric Power Company, for instance, the maximum power consumption in use and standby power consumption are: 220 W and 2.2 W for 32 in. wide-screen TV set; 19 W and 13.3 W for video deck; 26.7 W and 14.4 W for portable stereo equipment, respectively. It is said that 10% of entire power consumption of a household is the standby power consumption. It is estimated about 8,000 yen per annum on the basis of the power consumption of a standard household (power consumption; 280 KW·H/month). As the remote-control signal receiver is always in a standby state, it always consumes power. Said warm-up circuit is always applied with electric current and consumes power, as well. The power consumed by these parts is the standby power consumption of that electric appliance. Although power to operate a built-in clock is included in the standby power consumption in addition to that of said parts, the most part is occupied by that of said parts.

Recently, the reduction of the standby power consumption of various electric appliances has advanced and it is getting smaller. For example, some of the newest TV sets and video decks can stop the power supply to BS antenna that is a part of the warm-up circuit, or can stop the time display when they are not in use. As a result, some of TV sets and video decks consume the standby power of less than 1 W.

However, since the TV sets and video decks require the mode setting for that purpose or an operation of turning off the power switch of the main body of the appliances instead of the operation of the remote controller, it is somewhat troublesome. Therefore, it is feared that quite a few of users of the electric appliances do not use said function, and the effect is not quite sure. And, there is a possibility that a warm-up circuit includes functions that lower the operability of the electric appliances if it is not supplied with power at the start of use of the electric appliance.

Even though the standby power consumption of each electric appliance is small, as the number of electric appliance used are quite large, as a whole, the standby power consumption is quite large. The problem is the power consumption (W·H) that is a result of the standby power (W) multiplied by the standby time (H). Even though the standby power consumption is small, the power consumption of an electric appliance becomes quite large if the standby time is long. Therefore, it is required to reduce the standby power consumption of electric appliances much more.

An electric appliance has a manually operated main switch that cuts the power supply to all parts of the electric appliance. If the main switch is turned off, the power supply to the remote-control signal receiver is also terminated and power is not consumed, but it is required to turn the main switch on to make the remote controller usable again. This remarkably lessens the convenience of the remote controller of operating the electric appliance at the remote place from that.

If said main switch is turned off, the power supply to the warm-up circuit is also terminated and power is not consumed, but in some cases, it takes time until the electric appliance starts its functions after the user operated it, and there is a problem that especially the operability of audio-visual equipment becomes worse.

And that, if the main switch is turned off, the power supply to a built-in clock section is also terminated and the time is not displayed. When the main switch is turned on again, there is a possibility that the displayed time is not correct.

In addition, some of the newest electric appliances lack the main switch and do not allow this kind of operation.

SUMMARY OF THE INVENTION

It is an object of the present invention to provide an electric appliance that can reduce the power consumption, in particular, to provide an electric appliance that can reduce the power consumption without sacrificing the convenience of the remote controller and the effect of the warm-up.

In order to achieve the above objects, the present invention provides an electric appliance capable of saving power consumption, the electric appliance having its original function, comprising a first unit having an active state for performing the original function, and a rest state, a second unit having an effective state capable of causing the first unit to change from the rest state to the active state and an ineffective state incapable of causing the change in the first unit, and a third unit that changes the second unit from the ineffective state to the effective state when a first predetermined condition is satisfied. A first power consumption occurs in the active state of the first unit. A second power consumption also occurs in the effective state of the second unit although it is less than the first power consumption. The third unit according to the present invention saves the second power consumption until the first predetermined condition is satisfied. The second unit may not cause the first unit to change from the rest state to the active state when the third unit changes the state of the second unit.

Alternatively pursuant to present invention, the third unit changes the second unit from the effective state to the ineffective state when a second predetermined condition is satisfied. Also in this case the second power consumption is saved after the second predetermined condition is satisfied.

Pursuant to another aspect of the present invention, the third unit includes a clock section that outputs a signal at a preset time for changing the state of the second unit. In this case, the predetermined condition corresponds to the outputs of the signal from clock section. In other words, the state of the second unit is changed at the preset time. According to this feature for example, the second unit is kept in the ineffective state in the night for saving the power consumption during the user is sleeping.

Pursuant to a further aspect of the present invention, the electric appliance comprises a remote controller that outputs a control signal. Consequently the second unit includes a signal receiver that receives the control signal from the remote controller to change the first unit from rest state to the active state. Thus, the second unit is made possible to receive the signal from the remote controller when the predetermined condition is satisfied. Accordingly, the second power consumption is saved with the convenience of the remote controller is not sacrificed.

The present invention according to another aspect provides an electric appliance capable of saving power consumption comprising a first unit having an active state and a rest state, a second unit having a preparatory state and a rest state, and a third unit that changes the state of the second unit in response to a condition of the room where the electric appliance is installed. A first power consumption occurs in the active state of the first unit. A second power consumption also occurs in the preparatory state of the second unit although it is less than the first power consumption. The third unit according to the present invention saves the second power consumption while the condition of the room is in a predetermined condition. The second unit may not cause the first unit to change from the rest state to the preparatory state when the third unit changes the state of the second unit.

The second unit in the preparatory state is enabled to change the state of the first unit or facilitates a function of the first unit in the active state.

The third unit may include a sensor that senses a brightness of the room to change the state of the second unit in response to the brightness of the room.

Alternatively, the third unit may include a sensor that senses a presence of a person in the room to change the state of the second unit in response to the presence of the person in the room.

In the above cases, the predetermined condition corresponds to a brightness of the room less than a given value or a presence of no person. According to this feature, the second unit is kept in the rest state in the night or in absence of people in the room for saving the second power consumption.

The present invention also provides a first electric appliance capable of saving power consumption comprising a first unit having an active state and a rest state, a second unit having a preparatory state and a rest state, and a third unit that controls the change in the second unit between the rest state and preparatory state. The electric appliance further comprises a communicator that transmits a signal indicative of the state of the second unit to an external electric appliance. A first power consumption occurs in the active state of the first unit. A second power consumption also occurs in the preparatory state of the second unit although it is less than the first power consumption.

On the other hand, the present invention provides a second electric appliance capable of saving power consumption comprising a first unit having an active state and a rest state, a second unit having a preparatory state and a rest state, a third unit that controls the change in the second unit between the rest state and preparatory state, and a communicator that receives a signal from an external appliance, wherein the third unit changes the state of the second unit in response to the signal received by the communicator. A first power consumption occurs in the active state of the first unit. A second power consumption also occurs in the preparatory state of the second unit although it is less than the first power consumption.

The first electric appliance outputs the signal indicative of the state of its second unit and the second electric appliance receives it. Accordingly, the third unit of the second electric appliance changes the state of its second unit in response to the state of the third unit of the first electric appliance. In other words, the second power consumption of both the electric appliances are achieved at the same time.

The third unit of the first electric appliance may include a clock section that outputs a signal to change the state of the second unit at a preset time, and the communicator transmits the signal from the first electric appliance to the second electric appliance at the preset time. Accordingly, the second electric appliance does not need any clock section.

Alternatively, the third unit of the second electric appliance may further include clock section that outputs a signal to change the state of the second unit at a preset time. And communicator of the second electric appliance receives the preset time to be set in the clock section from the first electric appliance. Further, the current time information for adjusting the clock section may be transmitted from the first electric appliance to the second electric appliance together with the signal. According to this feature, even if a user sets the preset time in the first electric appliance alone, the second power consumption of second electric appliance is also saved. Similarly, even if a user adjusts the clock section of the first electric appliance only, the clock section of the second electric appliance can also keep the correct time.

Further, the present invention provides an electric appliance capable of saving power consumption comprising a clock section having a time keeping state and a rest state, a control section that controls the change in the clock section between the time keeping state and the rest state, a memory capable of storing a preset time for a coming function of the electric appliance, and a switch that turns off the electric appliance. A power consumption occurs in the time keeping state. The clock section adjusts its time for ensuring the function at the preset time when the switch turns off the electric appliance with a preset time stored in the memory.

Pursuant to another aspect of the present invention, the control section changes the clock section from the rest state to the time keeping state when the switch turns off the electric appliance. According to this feature, the clock section is kept in the rest state for saving the power consumption if the preset time is not stored in the memory.

The present invention also provides an electric appliance capable of saving power consumption comprising a clock section having a time keeping state and an rest state, a control section that controls the change in the clock section between the time keeping state and the rest state, the clock section being to be refreshed with the time information on the change from the rest state to the time keeping state, memory capable of storing a preset time for a coming function of the electric appliance, and an inhibitor that inhibits the clock section from changing from the time keeping state to the rest state with the preset time stored in the memory for ensuring the function at the preset time. If any preset time is not stored in the memory, on the contrary, the clock section is allowed to change into the rest state for a power consumption occurring in the time keeping state.

According to the above features and advantages of the present invention, an electric appliance capable of saving power consumption saves the second power consumption without sacrificing the convenience of a remote controller and operability of the electric appliance since the second unit keep a rest state only in the time-zone when an electric appliance is not in use. In other word, the power supply to the second unit, for instance, a remote-control signal receiver and a warm-up circuit is automatically terminated only in the time-zone when an electric appliance is not in use.

Furthermore, since the power supply to each part of the clock section is stopped so far as the reservation function of the electric appliance is not interfered and the time adjustment is automatically made whenever it is required, the second power consumption is saved without sacrificing the function and operability of an electric appliance.

Other feature and advantages according to the invention will be readily understood from the detailed description of the preferred embodiments in conjunction with the accompanying drawings.

DETAILED DESCRIPTION OF THE PREFERRED EMBODIMENTS

Figure 1:
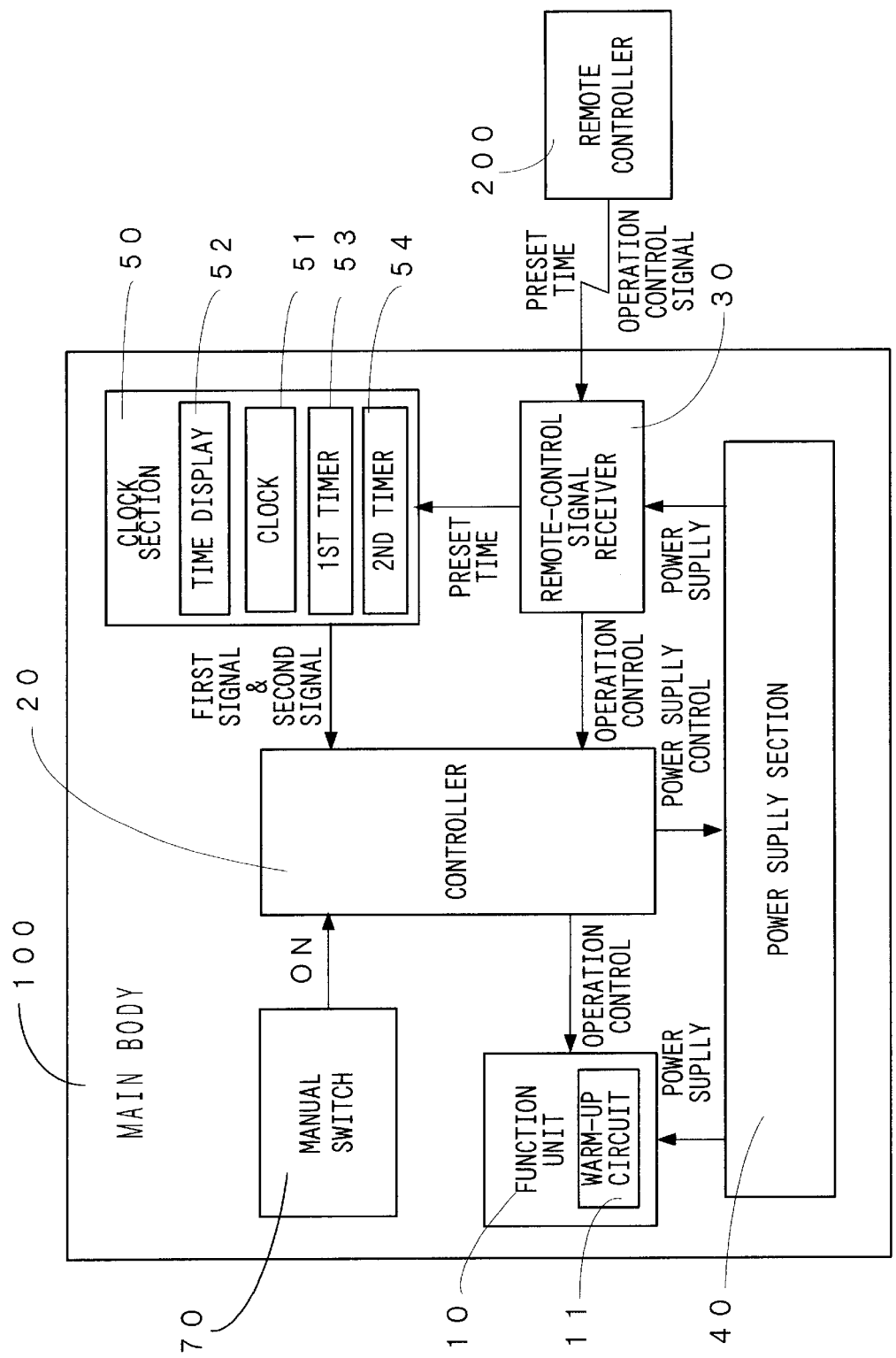
FIG. 1 is a block diagram showing the configuration of an appliance of an embodiment of the present invention.

FIG. 1 is a block diagram showing the configuration of an electric appliance of an embodiment of the present invention.

An electric appliance comprises main body 100 and remote controller 200 that remote-controls the operation of main body 100. Main body 100 includes function unit 10 that performs the original function of the electric appliance, controller 20 that controls the operation of function unit 10, remote-control signal receiver 30 that receives signals from remote controller 200, power supply section 40 that supplies electric power to each part of the electric appliance, clock section 50 that computes time all the time, outputs a signal at the preset time and displays the current time, and manually operated main switch (manual switch) 70. When manual switch 70 is turned on, controller 20 outputs a power-supply control signal to power supply section 40 and makes it to start the power supply to the each part of the appliance. Controller 20 consists of a micro processor that includes a CPU, etc.

Said electric appliance includes every kind of home appliance that has a remote controller and a clock including such audio-visual equipment as TV set, radio, video deck, CD player, tape recorder, DAT and DVD, and such other home appliance as air conditioner, electric fan and so on, but not limited to the home appliance.

Function unit 10 (which corresponds to first unit in the claim) is a unit that performs the original function of said each electric appliance in an active state, for example, if the electric appliance is a TV set, the unit is consisting of a TV broadcast wave receiver, a tuner, a CRT, a speaker, etc. In the example mentioned below, a TV set will be explained as an example of said electric appliance. Function unit 10 performs its function under the control of controller 20. Some of said electric appliances make a certain part of a circuit of function unit 10 (warm-up circuit 11 of FIG. 1), for instance, CRT drive circuit of a TV set or BS antenna of a video deck, to be in a warm-up state all the time so that they may be started immediately when they are operated by their users. Furthermore, many of said electric appliances display time when they are not in use. In the present example of embodiment, said time display is also included in said warmup for reasons of convenience.

Said remote-control signal receiver 30 and warm-up circuit 11 are included in a standby section (which corresponds to the second unit in the claim) of the present invention.

Remote controller 200 is similar to the publicly known remote controller that accompanies to the electric appliances, and outputs a control signal that controls the operation of the electric appliance as a wireless signal. For instance, a remote controller of a TV set has power ON/OFF button, channel select button, volume control button, image control button, etc. and when one of these buttons is pressed down, it emits infrared rays including a corresponding signal.

Remote-control signal receiver 30 receives an operation control signal from remote controller 200, and transmits its contents to controller 20. Controller 20 controls the operation of function unit 10 based on the contents of the operation control signal, for example, performs turning on/off of power supply section of TV set, channel change, volume control and so on.

Power supply section 40 supplies electric power to standby section 10 that includes warm-up circuit 11 and remote-control signal receiver 30. They become a effective state or a preparatory state. In addition, though not shown in FIG. 1 it also supplies the electric power to controller 20 and clock section 50. Clock section 50 has clock 51 and time display 52 that displays the time computed by clock 51 in a time keeping state. Clock section 50 also has a timer and outputs a signal to controller 20 at the preset time. Said timer has four time setters A~D in which a fixed time is set in advance and outputs signal A~D at said fixed time A~D set in time setters A~D. Hereinafter, simply mentioned signal stands for signal A~D. Said fixed time is set by operation of remote controller 200 in the time setter via remote-control signal receiver 30.

Times A and B set in time setters A and B are used as preset time for first timer 53. First timer 53 is a preset timer for a coming function of main body 100, controller 20 makes function unit 10 to start the operation based on preset time A and to stop the operation based on preset time B. In case of a TV set, TV broadcast receiving starts at time A and terminates at time B.

Times C and D set in time setters C and D are used as preset time for second timer 54. Second timer 54 as a standby power saving timer and makes the remote controller usable in fixed time-zone alone. Namely, controller 20 makes power supply section 40 to start the power supply to remote-control signal receiver 30 based on signal C (a first signal) and to stop it based on signal D (a second signal). Therefore, remote-control signal receiver 30 does not consume the electric power during this time zone. The electric power consumed by remote-control signal receiver 30 includes the electric power consumed by power supply section in order to supply the electric power to remote-control signal receiver 30. While the power supply is stopped, the remote-control signal from remote controller 200 is neglected and is invalid.

When controller 20 makes power supply section to start the power supply to remote-control signal receiver 30 based on signal C, it does not make power supply section to start the power supply to function unit 10, but it makes power supply section to start the power supply to function unit 10 by the subsequent operation of turning the power switch of main body 100 on by the remote controller. Of course, it may be arranged that the power supply to function unit 10 is started at the same time as the start of the power supply to remote-control signal receiver 30.

And, remote controller 200 is supplied with the necessary electric power by a built-in dry sell, but it does not require power except when it is operated. If said preset time C is set at 6 a.m. and said preset time D is set at 10 p.m., the standby power consumption for utilizing the function of remote controller is saved for eight hours from 10 p.m. to 6 a.m. everyday. Thus, the remote-control function is stopped only during the night time when the electric appliance is not used, therefore, the remote controller is not operated, and next morning, remote-control signal receiver 30 is made standby state, it is possible to save the electric power without sacrificing the convenience of the remote controller.

There are users whose living time-zone is changeable and especially whose bedtime varies. As a countermeasure, controller 20 is made to stop the power supply to remote-control signal receiver 30 by the remote-control signal receiver off signal from remote controller 200 either. In this case, preset time D is set at the later time. The remote-control signal receiver off signal may be made, for example, to turn off the power supply to function unit 10 by pressing down the power switch button equipped with remote controller 200 that turns on/off the power supply to function unit 10 and to be output by further pressing it more than two seconds.

When turning off the electric appliance at the time of going to bed, by pressing down the power switch button for more than two seconds, the power supply both to function unit 10 and remote-control signal receiver 30 is cut off. Even in case it is forgotten to turn off the electric appliance by said operation, or the operation to turn off the power supply is failed as the time of pressing down the button is too short, the power supply is terminated by preset time D that comes later. Of course, an exclusive switch may be prepared to turn off the power supply to both function unit 10 and remote-control signal receiver 30.

As mentioned before, preset time C and D can be freely set. Furthermore, two times for each may also be set. Therefore, the time-zone for stopping the power supply to remote-control signal receiver 30 may be set at the daytime or two time-zones both at night and in the daytime.

An electric appliance such as a video deck or a tape recorder that has the function of recording sometimes records the TV or radio broadcast at night when the power supply to remote-control signal receiver 30 is cut off, with starting function unit 10 by said first timer 53. Even in that case, recording is performed without hindrance, as the cut off of power supply from power supply section 40 is limited only to remote-control signal receiver 30.

And, said electric appliance has manual switch 70 that starts the power supply to remote-control signal receiver 30 by manual operation. The signal from manual switch 70 is prior to the signal from clock section 50. Namely, controller 20 makes power supply section 40 to start the power supply to remote-control signal receiver 30 in response to the signal from manual switch 70 even in the state that the power supply to remote-control signal receiver 30 is cut by signal D of second timer 54. Therefore, with pressing manual switch 70, the power supply to remote-control signal receiver 30 is started and the operation of the electric appliance is made possible even at the earlier time than preset time C. This is effective for electric appliances that are located in the place allowing easy access, such as TV set, video deck and so on. Manual switch 70 may be made an ON/OFF switch that serves both for supplying power to function unit 10 and at the same time the exclusive switch for cutting off the power to remote-control signal receiver 30.

Figure 2:
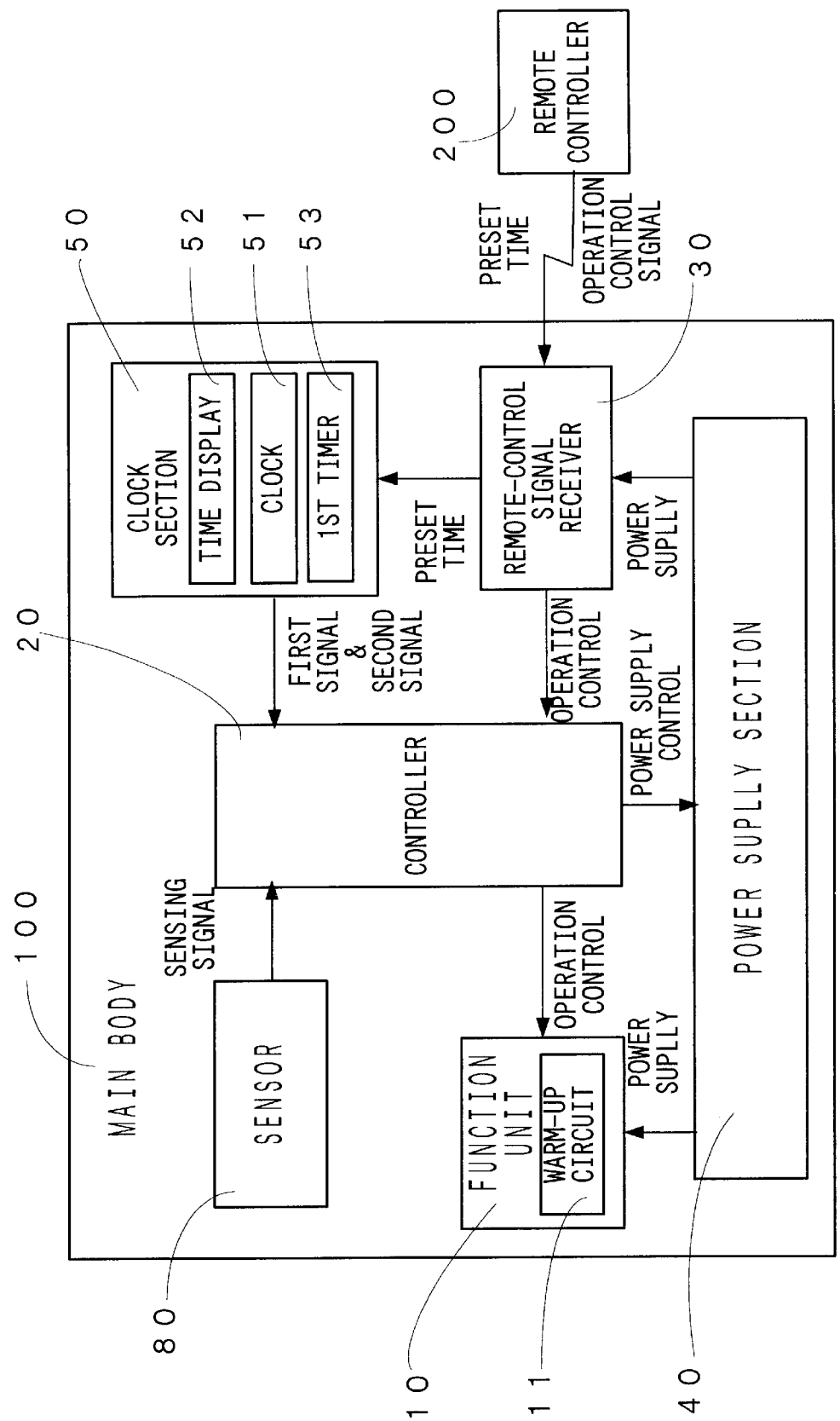
FIG. 2 is a block diagram showing the configuration of an appliance of another embodiment of the present invention.

FIG. 2 is a block diagram showing the configuration of another embodiment of the present invention. As the present embodiment is added sensor 80 to, and excluded manual switch 70 and second timer 54 of clock section 50 from the embodiment shown in FIG. 1 and other configuration is same, the same numerals are fixed and the explanation is omitted. Sensor 80 is a publicly known sensor that senses the existence of a person within the area possible to receive the signal from remote controller 200 by remote-control signal receiver 30. Sensor 80 outputs the sensing signal to controller 20 all the while it is sensing the existence of a person. Controller 20 makes the power supply section 40 to supply power to remote-control signal receiver 30 all the while it is receiving said sensing signal.

When remote controller 200 is operated, a person certainly exists within the effective area possible to receive the signal from remote controller 200 by remote-control signal receiver 30. Conversely, when there is no person, remote controller is never operated. Therefore, no trouble occurs even if the power supply to remote-control signal receiver 30 is being cut off during that period.

Or, said sensor 80 may be a publicly known sensor that senses the brightness of the room in which the electric appliance is installed. Said sensor outputs the sensing signal when the brightness of the room sensed is more than the prescribed value. Controller 20 makes power supply section 40 to supply power to remote-control signal receiver 30 all the while it is receiving said sensing signal.

For most electric appliances, it is in the daytime or at night when the room in which said electric appliances are installed is illuminated and the room is brighter than the prescribed brightness that remote controller is operated. Conversely, when the brightness of the room is less than the prescribed value, remote controller 200 is never operated. Therefore, no trouble occurs even if the power supply to remote-control signal receiver 30 is being cut off during that period.

In the above explanation, if the power supply to warm-up circuit 11 is started and stopped, instead of the power supply to remote-control signal receiver 30 is started and stopped, the standby power consumption of warm-up circuit 11 is reduced as well as the case explained above without sacrificing the operability of the electric appliance. As the power consumption of warm-up circuit is relatively large, compared with other parts the larger power consumption saving effect can be obtained. In addition to that, more power consumption is saved if the power supply to warm-up circuit is started and terminated at the same time when the power supply to remote-control signal receiver 30 is started and terminated.

Figure 3:
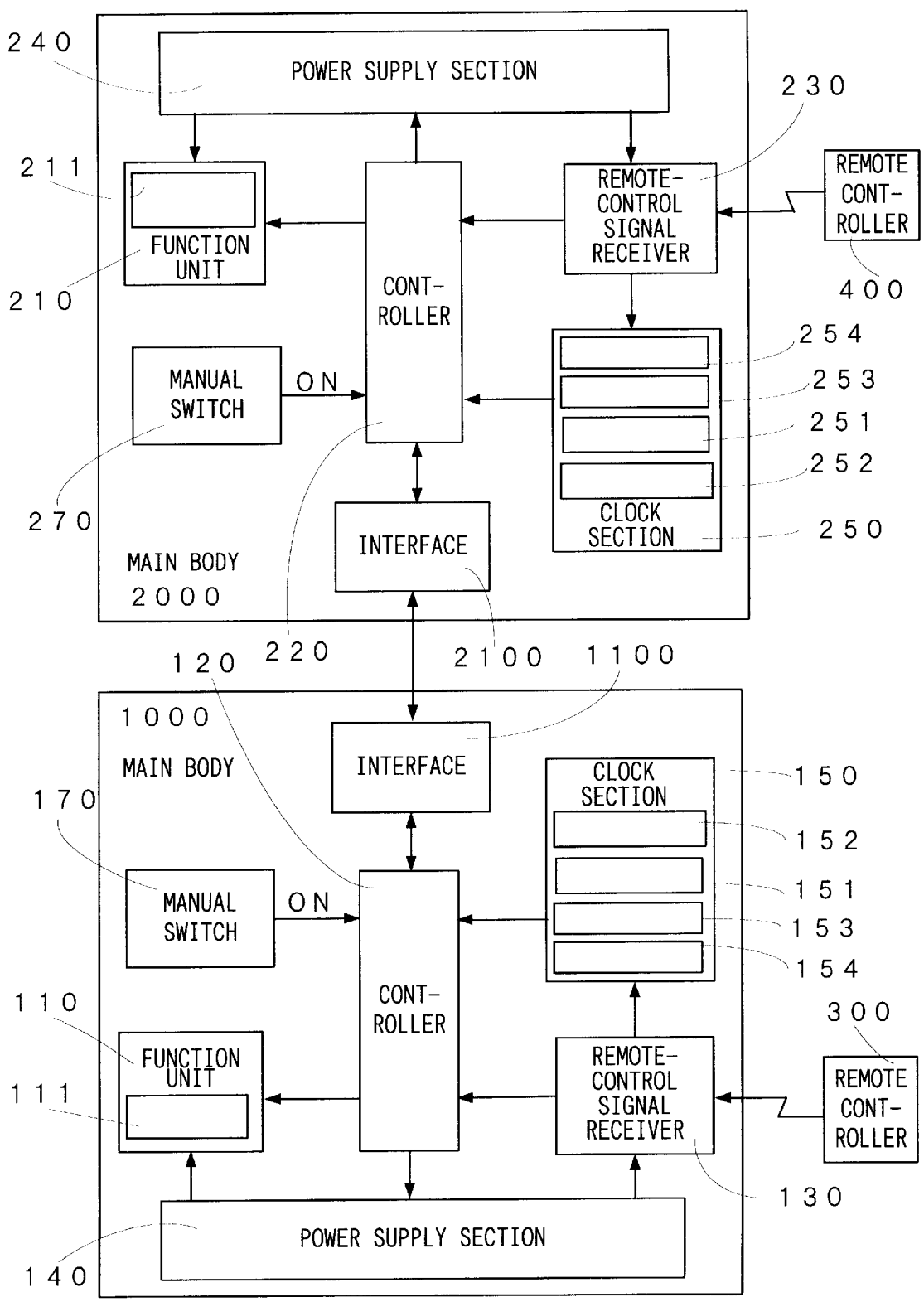
FIG. 3 is a block diagram showing the configuration of an appliance of still another embodiment of the present invention.

In still another embodiment shown in FIG. 3, first electric appliance 1000 and second electric appliance 2000 that have a function fulfilled only in collaboration with said electric appliance 1000 are connected with each other via interfaces equipped with each electric appliance.

Namely, in FIG. 3, electric appliance 1000 has the same configuration as electric appliance 100 shown in FIG. 1, except that IF 1100 is added. To the configuration elements of electric appliance 1000 same as the configuration of FIG. 1, numerals that are added 100 to numerals of FIG. 1 are fixed. Electric appliance 2000 has the same configuration as electric appliance 1000 and IF 2100 is equipped. To the configuration elements of electric appliance 2000 same as the configuration of FIG. 1, numerals that are added 200 to numerals of FIG. 1 are fixed. Both electric appliances 1000 and 2000 have functions mentioned about electric appliance 100 of FIG. 1.

IF 1100 and IF 2100 are connected to controller 120 and controller 220, respectively. IF 2100 is connected to IF 1100. Electric appliances 1000 and 2000 send and receive data to and from each other via IF 1100 and IF 2100 under the control of controller 120 and controller 220 respectively. IF 1100 and IF 2100 are interfaces based, for example, on IEEE 1394.

Of course, the original function of electric appliance 1000 that function unit 110 of electric appliance 1000 fulfils differs from the original function of electric appliance 2000 that function unit 210 of electric appliance 2000 fulfils. In the original function of electric appliance 2000, a function that is fulfilled by collaborating with the original function of electric appliance 1000 is included.

Said electric appliances 1000 and 2000 are, for instance, a TV set and a video deck (in random order). The playback image of video deck is displayed on the display screen of a TV set. Namely, a video deck can fulfil its playback function only in collaboration with a TV set. Therefore, in time-zone that a TV set is not used, a video deck is not used either. There is an exception of duplication of a video tape, but it is not used frequently.

The playback image signal from a video deck to a TV set is transmitted via a connecting cable not shown. Other signals between conventional video deck and TV set are also transmitted and received via a connecting cable not shown. Transmitting and receiving of data via before-mentioned IF 1100 and IF 1200 may be made via said connecting cable not shown.

The power supply section of first electric appliance 1000 is turned on, controller 120 outputs signals that show times C and D set in second timer 154 via IF 1100. Furthermore, controller 120 of first electric appliance 1000 outputs signals that show times C and D via IF 1100 at the time when said times C and D are set in second timer 154. Controller 220 of second electric appliance receives signals showing said times C and D from first electric appliance via IF 2100, and set said times C and D in second timer 254. Controller 220 controls the power supply from power supply section 240 to each part by prescribed time signals C and D that are output by second timer 254 at times C and D as electric appliance 100 in FIG. 1 does.

In this case, controller 120 may be made to read out the current time from clock section 151 and output it together with times C and D at the time when outputting times C and D, and controller 220 may be made to adjust the time of clock section 251 with said current time information.

Regarding the former, it may be made that, when the power supply section of electric appliance 2000 is turned on, controller 220 checks if times C and D are set in second timer 254, and, if they are not set, it reads out times C and D set in second timer 154 of first electric appliance 1000 via IF 2100 and IF 1100, and set said times C and D in second timer 254 of second electric appliance 2000.

In this case, controller 220 may be made to read out the current time from clock section 151 at the time when it reads out times C and D from second timer 154 and adjusts the time of clock section 251 by said current time information.

Figure 4:
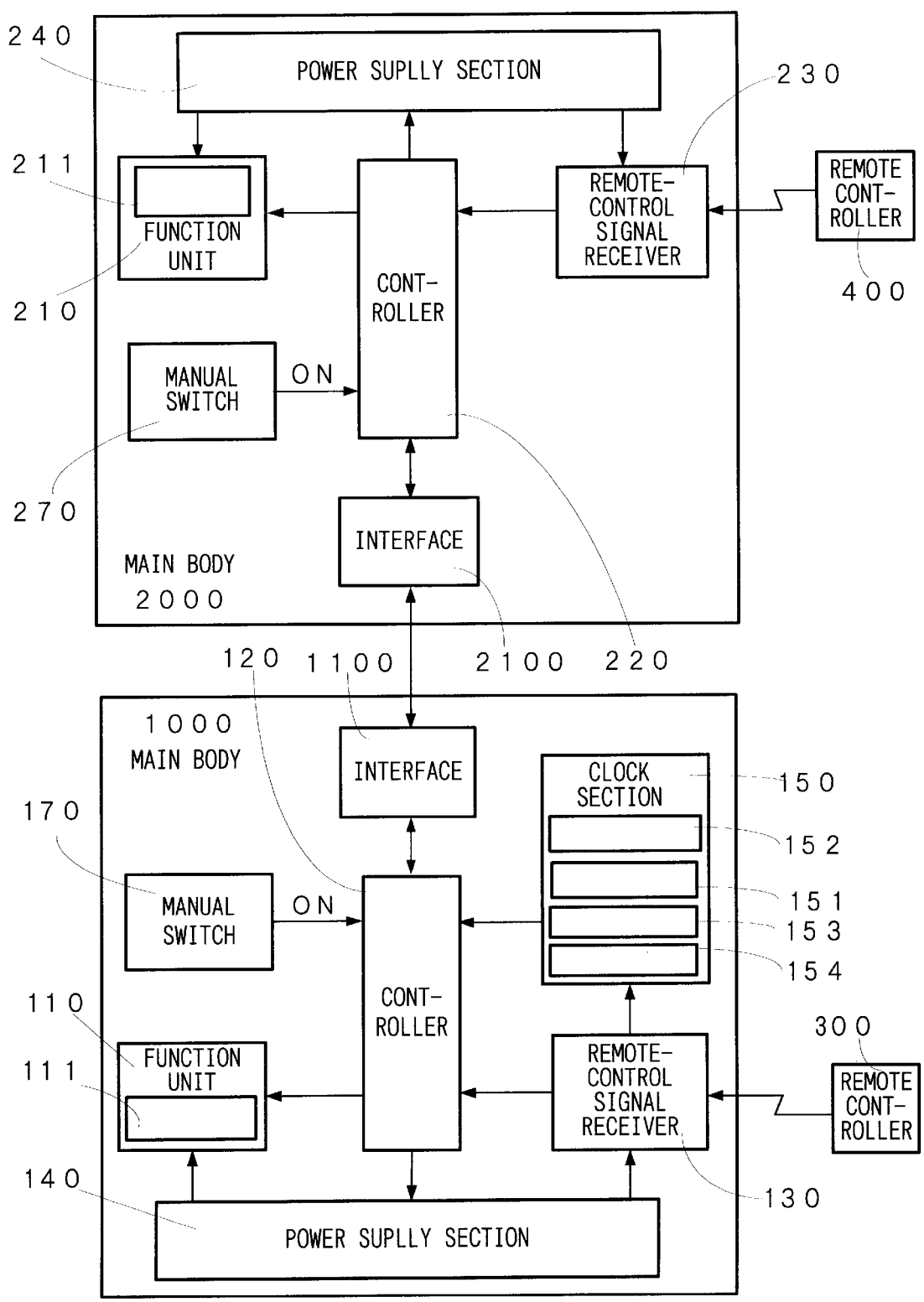
FIG. 4 is a block diagram showing the variation of the configuration of FIG. 3.

As shown in FIG. 4, clock section 250 may be eliminated from embodiment shown in FIG. 3. In this case, controller 220 of second electric appliance 2000 receives prescribed time signals C and D that are output by second timer 154 of first electric appliance 1000 via IF 2100 and IF 1100, and controller 120, and controls the power supply from power supply section 240 to each part as electric appliance 100 of FIG. 1 does.

In both embodiments of FIG. 3 and FIG. 4, if a user sets prescribed time in second timer 154 of first electric appliance 1000 alone, the standby power consumption of second electric appliance 100 is saved.

In both embodiments of FIG. 3 and FIG. 4, the configuration of first electric appliance 1000 may be that of FIG. 2 added with IF 1100. Second electric appliance 2000 may be independent of the function of first electric appliance 1000 as far as it is used in the same time-zone as first electric appliance 1000.

Figure 5:
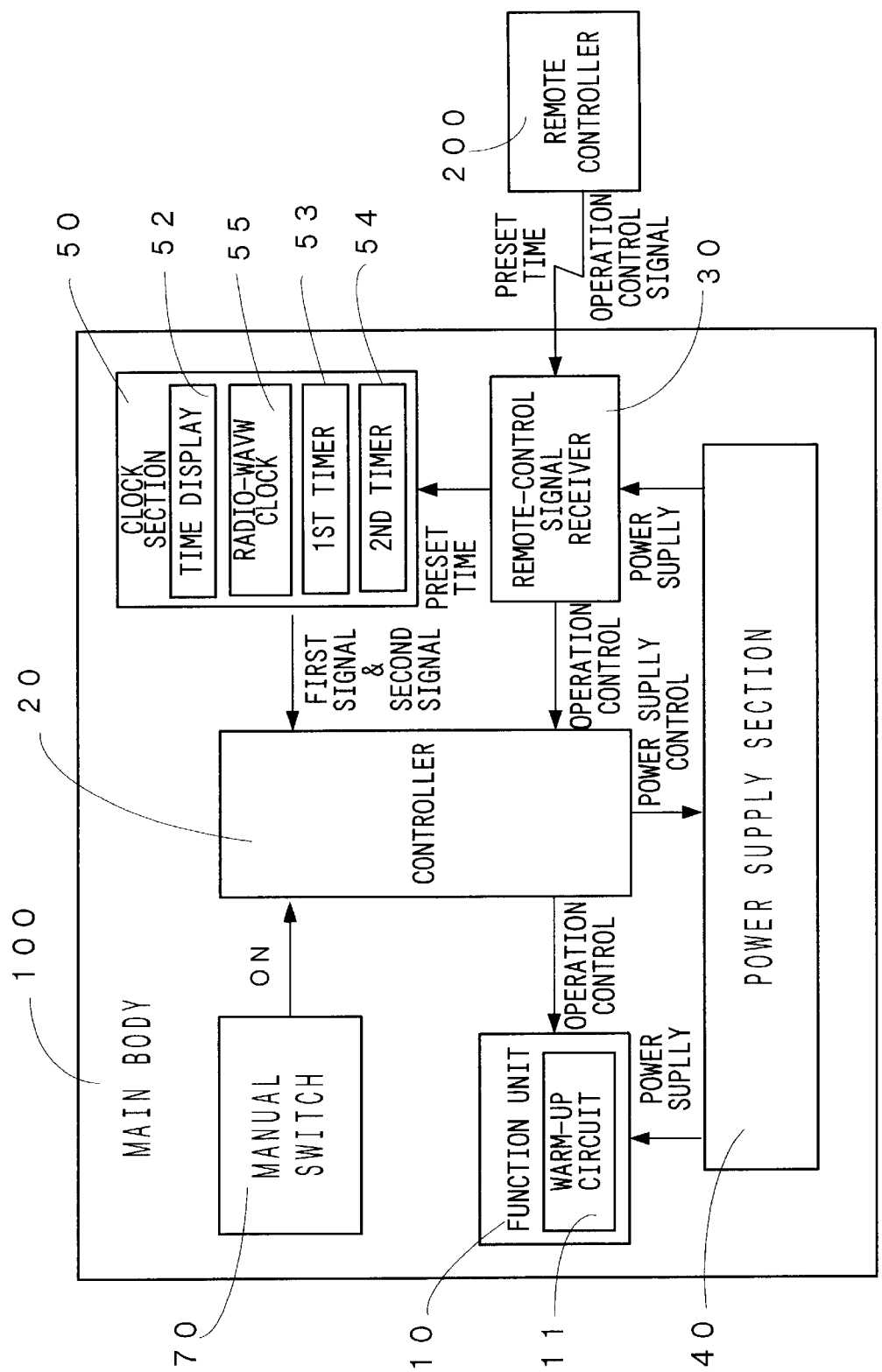
FIG. 5 is a block diagram showing the configuration of an appliance of yet another embodiment of the present invention.

FIG. 5 is a block diagram showing the configuration of yet another embodiment of the present invention. The clock of clock section 50 of the present embodiment is radio-wave clock 55 that receives a broadcast including a time information and adjusts its time, as well as it computes time. As other elements are same as embodiment of FIG. 1, they are given same numerals as FIG. 1 and explanation is omitted.

One of broadcasts that includes said time information is, for example, a long-wave standard radio JJY operated by Communications Research Laboratory of the Ministry of Posts and Telecommunications. Long-wave standard radio JJY includes information of year, month, day, and time of Japanese Standard Time at a cycle of 60 seconds. Some of FM teletext broadcasts also broadcast similar information at a cycle of one minute. For example, the JFN network including Tokyo FM as a key station has started broadcasting, though experimentally. Other than this, similar broadcasts including time information at a short period can be utilized.

In case that the electric appliance is for example, AM/FM radio, an appliance that has a function of receiving a broadcast, all or part of the receiving circuit of radio-wave clock 55 can be served by the receiving circuit of said electric appliance.

Radio-wave clock 55 makes said time adjustment when the power supply section of the electric appliance is turned on. And, when it is turned off, controller 20 checks if there is a reservation for operation of the electric appliance by first timer 53 or not, and if there is a reservation, it terminates the power supply to function unit 10 and continues the power supply to clock section 50. Consequently, first timer 53 keeps working, and when the set time C comes, the operation of the electric appliance is started. If there is no reservation, it terminates the power supply both to function unit 10 and clock section 50. By this, clock section 50 stops time computing and displaying to time display 52. Consequently, these parts do not consume electric power. When the electric appliance is turned on next, the time of clock section 50 is not correct, but the broadcast including time information is received and the time adjustment is immediately made, no trouble occurs.

Or, it may be made that radio-wave clock 55 makes said time adjustment based on the command of controller 20, supplies power and makes time display 52 to display time, and controller 20 checks if there is a reservation for operation of the electric appliance by first timer 53 or not, when the electric appliance if turned off, and if there is a reservation, it makes radio-wave clock 55 to adjust said time, and at the same time, terminates the power supply to function unit 10 and continues the power supply to clock section 50, and if there is no reservation, makes radio-wave clock 55 to adjust time, terminates the power supply both to function unit 10 and clock section 50.

Power supply section 40 of the electric appliance in this case, does not start the power supply to radio-wave clock 55 and time display 52 of clock section 50, but start the power supply to first timer 53. As a result, computing and displaying time is not made, but to set a prescribed time C in first timer 53, that is, to reserve the operation of said electric appliance is possible. Otherwise, it may be made that the power supply to clock section 50 including first timer 53 is not started when said electric appliance is turned on, but the power supply to first timer 53 is started when the operation with reference to reservation for operation of said electric appliance is made. At this time, the power supply to entire clock section 50 may be started. In both cases, the reservation for operation of said electric appliance can be made.

Even if the electric appliance is turned off in the state of having a reservation for operation, first timer 53 keeps operating and when a prescribed time C comes, operation of said electric appliance is started.

If the electric appliance is turned off in the state of having no reservation for operation, the power supply to radio-wave clock 55 and time display 52 is not made and the time is not displayed at time display 52. Consequently, while the electric appliance is used, or until the operation for reserving operation is made, at least radio-wave clock 55 and time display 52 do not consume power.

In the meanwhile, time is not displayed at time display 52, but the display of most of the present electric appliances display the situation of operation while said electric appliances are in use, and the time is displayed only while it is not in use. Therefore, particular troubles do not occur.

By the present invention, the standby power consumption is saved without sacrificing the convenience of a remote controller and operability of an electric appliance since the power supply to each part except a function unit, for instance, a remote-control signal receiver and a warm-up circuit is automatically terminated only in the time-zone when an electric appliance is not in use.

In addition, since said power supply can be terminated by the fixed operation even before the time when said power supply is automatically terminated, the standby power consumption can be saved more efficiently.

Furthermore, since the power supply to each part of the clock section is stopped so far as the reservation function of an electric appliance is not interfered and the time adjustment is automatically made whenever it is required, the standby power consumption is saved without sacrificing the function and operability of an electric appliance.

What is claimed is:

1. An electric appliance capable of saving power consumption, the electric appliance having its original function, comprising:
   a first unit having an active state for performing the original function and a rest state, a first power consumption occurring in the active state;
   a second unit having an effective state capable of causing the first unit to change from the rest state to the active state and an ineffective state incapable of causing the change in the first unit, a second power consumption less than the first power consumption occurring in the effective state; and
   a third unit that changes the second unit from the ineffective state to the effective state when a first predetermined condition is satisfied, whereby the second power consumption is saved until the first predetermined condition is satisfied.

2. The electric appliance according to claim 1, wherein the second unit does not cause the first unit to change from the rest state to the active state when the third unit changes the state of the second unit.

3. The electric appliance according to claim 1, wherein the third unit changes the second unit from the effective state to the ineffective state when a second predetermined condition is satisfied whereby the second power consumption is saved after the second predetermined condition is satisfied.

4. The electric appliance according to claim 1, wherein the third unit includes a clock section that outputs a first signal at a first preset time for changing the state of the second unit.

5. The electric appliance according to claim 4, wherein the clock section outputs a second signal at a second preset time for changing the second unit from the effective state to the ineffective state.

6. The electric appliance according to claim 1, further comprising:
   a power supply section that supplies the electric power to the first unit and the second unit; and
   a controller that controls the power supply from the power supply section to the second unit,
   wherein the controller makes the power supply section start the power supply to the second unit in response to the first predetermined condition satisfied.

7. The electric appliance according to claim 6, further comprising a remote controller that outputs a control signal, wherein the second unit includes a signal receiver that receives the control signal from the remote controller to change the first unit from rest state to the active state.

8. The electric appliance according to claim 1, further comprising a remote controller that outputs a control signal, wherein the second unit includes a signal receiver that receives the control signal from the remote controller to change the first unit from rest state to the active state.

9. The electric appliance according to claim 1, wherein the third unit changes the state of the second unit in response to a condition of a room where the electric appliance is installed.

10. The electric appliance according to claim 1, further comprising a communicator that transmits a signal indicative of the state of the second unit transmits to an external electric appliance.

11. The electric appliance according to claim 1, further comprising a communicator that receives a signal from an external appliance, wherein the third unit changes the state of the second unit in response to a signal received by the communicator.

12. The electric appliance according to claim 1, wherein the third unit includes a clock section having a time keeping state and a rest state, a third power consumption occurring in the time keeping state.

13. An electric appliance capable of saving power consumption, the electric appliance having its original function, comprising:
   a first unit having an active state for performing the original function and a rest state, a first power consumption occurring in the active state;

a second unit having an effective state capable of causing the first unit to change from the rest state to the active state and an ineffective state incapable of causing the change in the first unit, a second power consumption less than the first power consumption occurring in the effective state; and a third unit that changes the second unit from the effective state to the ineffective state when a predetermined condition is satisfied, whereby the second power consumption is saved after the second predetermined condition is satisfied.

14. An electric appliance capable of saving power consumption comprising:

a first unit having an active state and a rest state, a first power consumption occurring in the active state;

a second unit having a preparatory state and a rest state, a second power consumption less than the first power consumption occurring in the preparatory state; and a third unit that changes the state of the second unit in response to a condition of the room where the electric appliance is installed.

15. The electric appliance according to claim 14, wherein the second unit does not cause the first unit to change from the rest state to the preparatory state when the third unit changes the state of the second unit.

16. The electric appliance according to claim 14, wherein the second unit in the preparatory state is enabled to change the state of the first unit.

17. The electric appliance according to claim 14, wherein the second unit in the preparatory state facilitates a function of the first unit in the active state.

18. The electric appliance according to claim 14, wherein the third unit includes a sensor that senses the brightness of the room.

19. The electric appliance according to claim 14, wherein the third unit includes a sensor that senses a presence of a person in the room.

20. The electric appliance according to claim 19, further comprising a remote controller that outputs a control signal, wherein the second unit includes a signal receiver that receives the control signal from the remote controller, and wherein the sensor senses the presence of the person within an aria of the room where the signal receiver can receive the control signal form the remote controller.

21. An electric appliance capable of saving power consumption comprising:

a first unit having an active state and a rest state, a first power consumption occurring in the active state;

a second unit having a preparatory state and a rest state, a second power consumption less than the first power consumption occurring in the preparatory state;

a third unit that controls the change in the second unit between the rest state and the preparatory state; and a communicator that transmits a signal indicative of the state of the second unit to an external electric appliance.

22. The electric appliance according to claim 21, wherein the third unit includes a clock section that outputs a signal to change the state of the second unit at a preset time, whereby the communicator transmits the signal at the preset time.

23. The electric appliance according to claim 22, wherein the communicator transmits the information of the current time together with the signal.

24. An electric appliance capable of saving power consumption comprising:

a first unit having an active state and rest state, a first power consumption occurring in the active state;

a second unit having a preparatory state and a rest state, a second power consumption less than the first power consumption occurring in the preparatory state;

a third unit that controls the change in the second unit between the rest state and the preparatory state; and a communicator that receives a signal from an external electric appliance, wherein the third unit changes the state of the second unit in response to the signal received by the communicator.

25. The electric appliance according to claim 24, wherein the third unit includes a clock section that outputs a signal at a preset time, and wherein the communicator further receives from the external electric appliance an information of the preset time to be set in the clock section is received.

26. The electric appliance according to claim 24, wherein the third unit includes a clock section that controls the second unit, the clock section adjusting the current time in accordance with an information from the outside.

27. The electric appliance according to claim 26, wherein the communicator further receives an information of the current time from the external electric appliance.

28. An electric appliance capable of saving power consumption comprising:

a clock section having a time keeping state and a rest state, a power consumption occurring in the time keeping state;

a control section that controls the change in the clock section between the time keeping state and the rest state for saving the power consumption;

a memory capable of storing a preset time for a coming function of the electric appliance; and a switch that turns off the electric appliance, wherein the clock section adjust its time for ensuring the function at the preset time when the switch turns off the electric appliance with the preset time stored in the memory.

29. The electric appliance according to claim 28, wherein the control section changes the clock section from the rest state to the time keeping state when the switch turns off the electric appliance.

30. The electric appliance according to claim 28, wherein the clock section adjusts its time by obtaining a time information from a broadcast including the current time information.

31. An electric appliance capable of saving power consumption comprising:

a clock section having a time keeping state and a rest state, a power consumption occurring in the time keeping state;

a control section that controls the change in the clock section between the time keeping state and the rest state for saving the power consumption, the clock section being to be refreshed with the time information on the change from the rest state to the time keeping state;

memory capable of storing a preset time for a coming function of the electric appliance; and an inhibitor that inhibits the clock section from changing from the time keeping state to the rest state with the preset time stored in the memory for ensuring the function at the preset time.

32. The electric appliance according to claim 31, wherein the inhibitor does not inhibit the clock section from changing from the time keeping state to the rest state with the no preset time stored in the memory.

* * * * *